March 1, 1938. W. I. BALLENTINE 2,109,521
APPARATUS FOR TESTING HARDNESS
Filed April 12, 1934 5 Sheets-Sheet 2

Inventor
William I. Ballentine
by Parker + Carter,
Attorneys.

Patented Mar. 1, 1938

2,109,521

UNITED STATES PATENT OFFICE 2,109,521

APPARATUS FOR TESTING HARDNESS

William I. Ballentine, La Porte, Ind.

Application April 12, 1934, Serial No. 720,181

13 Claims. (Cl. 265—13)

This invention relates to an apparatus or machine for determining hardness of materials.

One object of the invention is to provide a machine whereby hardness of materials may be determined conveniently and accurately and under uniform conditions.

Another object is to provide in connection with a hardness tester a gauge mounted upon and arranged to move with a portion of the testing apparatus.

The invention is illustrated more or less diagrammatically in the accompanying drawings, wherein—

Like parts are designated by like characters throughout the specification and drawings.

A is a base portion which may be of any suitable size or shape. It may have a raised area $A^1$ on its upper surface, arranged particularly to receive the material to be tested or to receive a support for the material to be tested. To provide means for leveling the apparatus it may be given a three-point support. As will be seen from the plan view of Figure 3, the forward end of the platform or base may be slightly pointed, although the base may be conveniently made of any desired shape. Adjacent its forward end the base is provided on its under surface with a threaded pin $A^2$ which is preferably provided with a ball point $A^3$. The ball point receives a socket member $A^4$ which has a flat, downwardly faced foot portion $A^5$. The threaded member $A^2$ may be adjusted in and out to vary its height.

Preferably adjacent the rear edge of the base A is mounted a pair of threaded members $A^6$, $A^6$. As shown, these members extend through threaded perforations in the base and each of them is preferably provided on its upper end with a knurled thumb nut or knob $A^7$. At its lower end each of the members $A^6$ is provided with a ball point $A^8$ to receive a socket member $A^9$ which terminates in a flattened foot member $A^{10}$.

Figures 1, 3, 5:
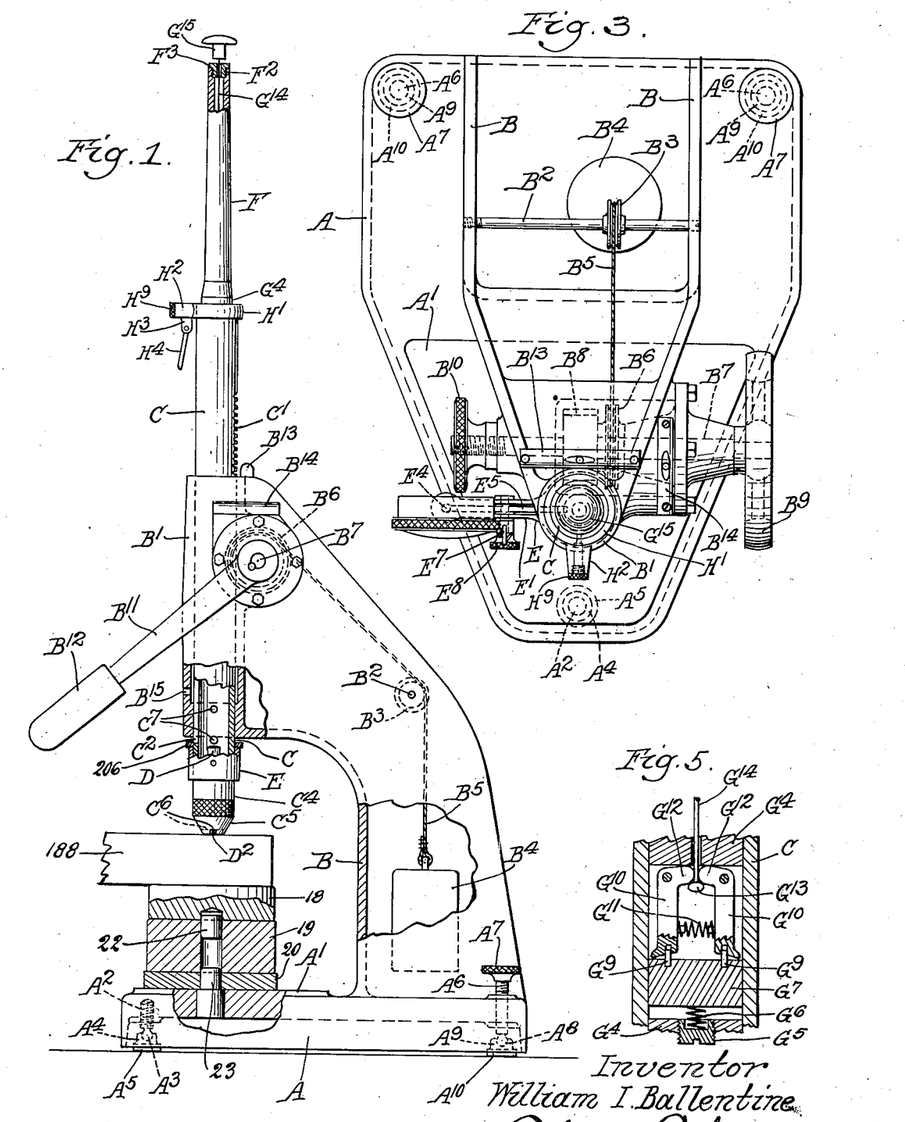
Figure 1 is a side elevation with parts broken away and parts in section.
Figure 3 is a top plan view.
Figure 5 is a detail of a rebound check.
Figures 2, 4:
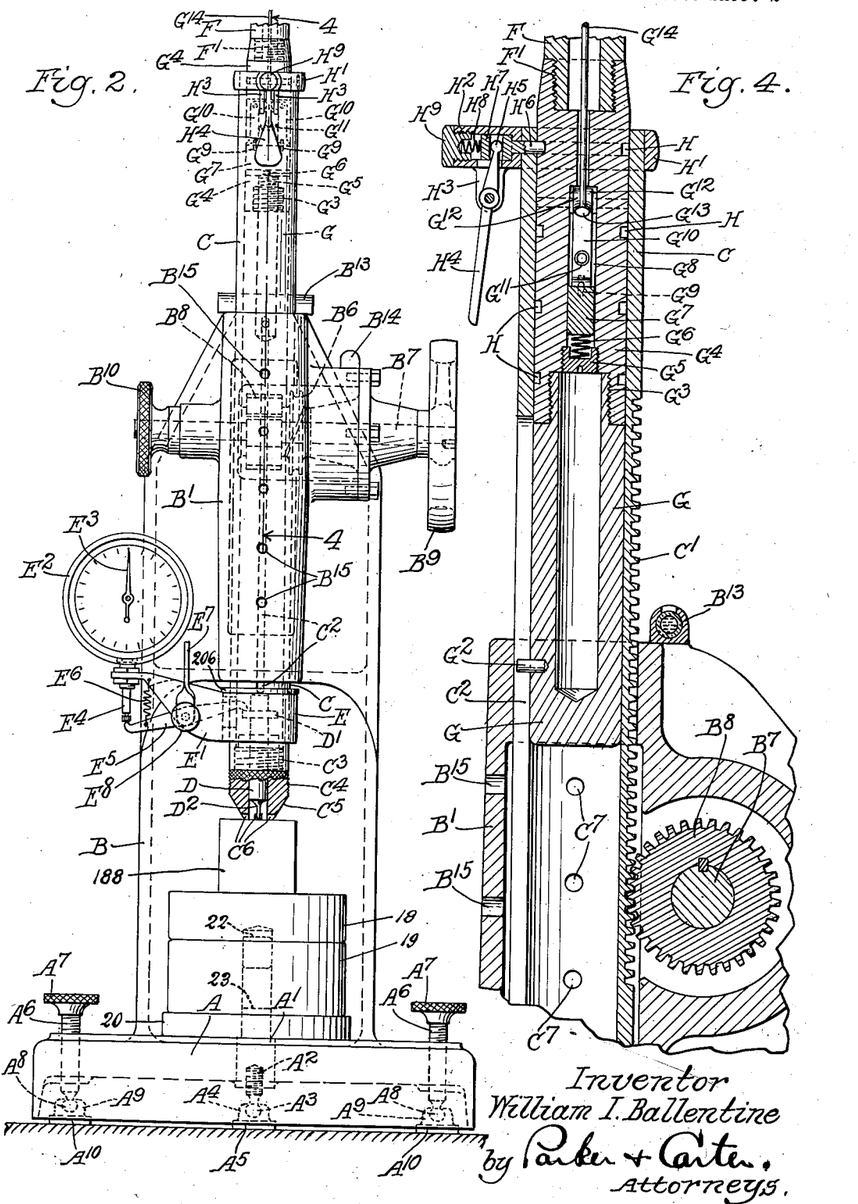
Figure 2 is a front elevation with parts broken away and parts in section.
Figure 4 is a vertical section along the line 4—4 of Figure 2.

Formed preferably integrally with the base, and extending upwardly from it, is a standard B. It may be of any desired shape, but as shown it is preferably hollow. It is provided with a vertically disposed, tubular portion $B^1$. Mounted in the standard B is a shaft $B^2$ which has journaled upon it a sheave $B^3$. $B^4$ is a counterweight supported upon a flexible member $B^5$ which passes over the sheave $B^3$ and is anchored on and wound about the drum $B^6$ which is fixed upon a shaft $B^7$ supported in suitable bearings in the standard B. A pinion $B^8$ is also fixed upon the shaft $B^7$. At one end the shaft $B^7$ may carry a hand or adjusting wheel $B^9$ and at its other it may be threaded to receive a correspondingly threaded and knurled locking nut $B^{10}$ as shown in Figs. 2 and 3. The locking nut $B^{10}$ might be omitted if desired and instead of the wheel $B^9$ there might be mounted upon the shaft $B^7$ a lever $B^{11}$, terminating in a handle $B^{12}$ as shown in Fig. 1. Mounted upon the standard B or elsewhere upon the apparatus are one or more levels $B^{13}$, $B^{14}$. $B^{15}$ $B^{15}$ are vent holes in the member $B^1$. The arm $B^{11}$ may be of spring material or may be yieldingly mounted.

C is a tube which carries the hammer, the gauge and the other measuring apparatus. It is preferably formed with a rack $C^1$ along one side, with which the pinion $B^8$ meshes. It may be slotted as at $C^2$ throughout a portion of its length. At its lower end it is interiorly threaded as at $C^3$ to receive a correspondingly threaded plug $C^4$. The plug may be of any suitable shape. As shown it is slightly tapered, as at $C^5$ and is provided with cross notches $C^6$, $C^6$. It is adapted to be screwed into place in the open lower end of the tube C. $C^7$, $C^7$ are vent holes in the tube C.

D is a percussion or penetrator member mounted within the hollow plug $C^4$ and adapted for relative longitudinal movement with respect thereto. It may carry, preferably adjacent its upper end, a laterally extending flange $D^1$ which limits its downward movement through the plug $C^4$. At its lower end it carries or terminates in a point $D^2$. The point may have any desired shape. As shown it is rounded but the invention is in no way limited to any particular shape of point and the one illustrated herewith is merely as an example.

Fixed upon the tube C and preferably adjacent its lower end, is a member E, carrying a laterally extending arm $E^1$. Mounted upon the arm $E^1$ is a gauge $E^2$ which may be of any suitable type. As shown it includes a pointer $E^3$ and an outwardly or downwardly projecting member $E^4$. Pivoted on the arm $E^1$ is a lever $E^5$ of which one end rests against the member $E^4$ of the gauge and the other end rests upon the flange $D^1$ of the pin carrying member or penetrator D. A tension spring $E^6$ is fastened at one end upon the arm $E^1$ and at the other upon the lever $E^5$ and draws the outer end upward against the gauge member $E^4$ and holds its inner end in contact with the flange $D^1$ of the pin-carrying member D. A locking member $E^7$ is provided by means of which the lever $E^5$ may be locked to prevent its movement. When measurements are to be taken the lock nut $E^8$ is loosened and lever $E^7$ is moved to free the lever $E^5$ for movement.

The lock nut $E^8$ is threaded on the same screw upon which the lever $E^7$ is threaded. Release of the lock nut makes it possible to rotate the screw $E^7$ and thereby release the pressure on the sides of the lever $E^5$ thus putting the lever $E^5$ in position to rotate freely on its pivot on the screw to respond to the position of the member D and so actuate the gauge.

Projecting above the upper end of the tube C is a hammer extension F. It may be tapered as shown and is reduced at its lower end and threaded exteriorly as at $F^1$ to be screwed into the correspondingly interiorly threaded central portion of the hammer $G^4$. At its upper end the extension F may receive a threaded hollow plug member $F^2$. The diameter of the perforation through this plug $F^2$ is preferably less than the interior diameter of the extension F. The plug may be provided with an outwardly extending knurled flange $F^3$.

The hammer is mounted to fall within the tube C. It is built up of the hammer extension F, the central portion $G^4$ and the hollow head portion G. $G^2$ is a pin on the hammer head G projecting into the slot $C^2$ in the tube C. The upper end of the hammer head is reduced and interiorly threaded to engage in threaded relation the central portion $G^4$ of the hammer. A threaded plug $G^5$ may be inserted in the lower end of the member $G^4$. A compression spring $G^6$ is seated upon the plug $G^5$ and bears against a block $G^7$ which is mounted in the slot $G^8$ in the member $G^4$. On its upper surface the block carries a pair of upwardly extending pins $G^9$, $G^9$. Pivoted in the slot $G^8$ of the extension member $G^4$ is a pair of dogs $G^{10}$, $G^{10}$. They are perforated in their lower ends to receive the pins $G^9$, $G^9$ and when the pins engage in the perforations of the dogs $G^{10}$ they hold the latter against outward displacement. $G^{11}$ is a compression spring positioned between the dogs $G^{10}$ and adapted when free to do so to move them outwardly against the interior of the tube or barrel C. At their inner, upper ends the dogs $G^{10}$ are provided with curved faces $G^{12}$ and between these curved faces the lower end $G^{13}$ of the lifting rod $G^{14}$ is positioned. At its upper end the rod $G^{14}$ terminates in a lifting handle $G^{15}$.

Preferably adjacent its upper end the member $G^4$ is provided with annular grooves H. $H^1$ is a collar positioned about the upper end of the tube or barrel C and formed with a projecting arm $H^2$. A pair of downwardly extending arms $H^3$ formed on the arm $H^2$ provide a bearing for lever $H^4$. The outer end of the lever serves as a handle by means of which it is moved. The inner end is preferably provided with a ball point $H^5$ which enters a notch in the head $H^7$, of a locking pin $H^6$. The pin $H^6$ is held in locked position by a compression spring $H^8$ which is itself held in place by a knurled and threaded plug $H^9$ removably seated in the arm $H^2$ of the collar $H^1$. The spring normally holds the parts in the position shown in Figure 1, in which the locking pin $H^6$ is forced into the uppermost groove or depression H in the central memebr $G^4$ of the hammer and thus the hammer is held up.

In the form shown in Figures 6 to 18, I have illustrated an electromagnetically controlled hammer and associated parts with certain changes in the supporting structure intended to give in connection with the hammer even greater accuracy than the device shown in Figures 1 to 5.

I is a supporting base having level tubes 2, 3. It is supported on feet not specifically illustrated, identical with the supporting feet associated with the base A in Figure 1. 4 is a hollow standard projecting upwardly from the base and carrying at its outer extremity a guide sleeve 5, which projects upwardly above the standard in a cylindrical extension 6. Mounted within the outer extremity of the standard is a gear 7 on a shaft 8, journalled in the walls of the standard and having an operating arm 9. The gear extends inwardly through a slot 10 to engage rack teeth 11 on a tube 12 slidable vertically in the guide sleeve 5. This tube is, of course, constrained to a vertical movement by its relation with the guide sleeve when the base I is level with the level tubes 2 and 3. Mounted on the tube 12 above the standard 4 is a cylindrical receptacle 13 rigidly attached to the tube by means of the set screws 14, and adapted to contain lead or other suitable ballast 15. This receptacle is recessed from below as at 16 so as to encircle but not contact the cylindrical extension 6. 17 is a leather washer adapted to contact the upper end of the extension 6 and cushion the shock when by extension the tube is brought down too far or too violently. In line with the tube is an adjustable anvil the details of which are the same as Fig. 1, which anvil is made up of a working plate 18, a filler plate 19, a supporting plate 20, all mounted on a raised platform 21 on the base and held in alignment by dowel pins 22, 23 whereas in Figure 1, an object 188 to be tested is shown resting on the plate 18, in Figure 6 no such object is shown and the slidable tube is at its lowermost position. The tube 12 terminates at its lower end in a head identical with the head disclosed in Figures 1 and 2 and provided with the same indicator gauge pointer and associated mechanism, the difference between the two devices being altogether above this penetrator holder.

24 is an electromagnet housing or cartridge adapted to be located at the top of and adjustably positioned in the tube 12. The tube 12 is slotted as at 25 and a thumb screw 26 associated with a washer 27 conforming to the contour of the tube is threaded in a hole 28 in the magnet cartridge so that the magnet may be moved up or down and locked in position in the tube. 29 is an electromagnetic coil having a core 30, the coil and core are seated and held rigidly in position in the cartridge 24 by means of a centrally apertured bronze plug 31 at the lower end and an iron threaded plug 32 at the upper end. One terminal of the coil comes out through an aperture and is grounded on the screw 33 on the electromagnetic cartridge 24. The other terminal wire 35 comes out from the coil through the top of the sleeve and will be later discussed. The plug 31, which is as above indicated centrally apertured as first a taper aperture 36 and then a cylindrical aperture 37, which cylindrical aperture is closed by the end of the core 30. It will be understood that the purpose of this magnet is to support, and hold central, and thereafter release without jar the testing hammer, that the adjustability of the magnet sleeve or cartridge on the tube is for the purpose of making it possible to adjust the height of drop of the hammer.

Figures 6, 7, 8, 9, 10, 11:
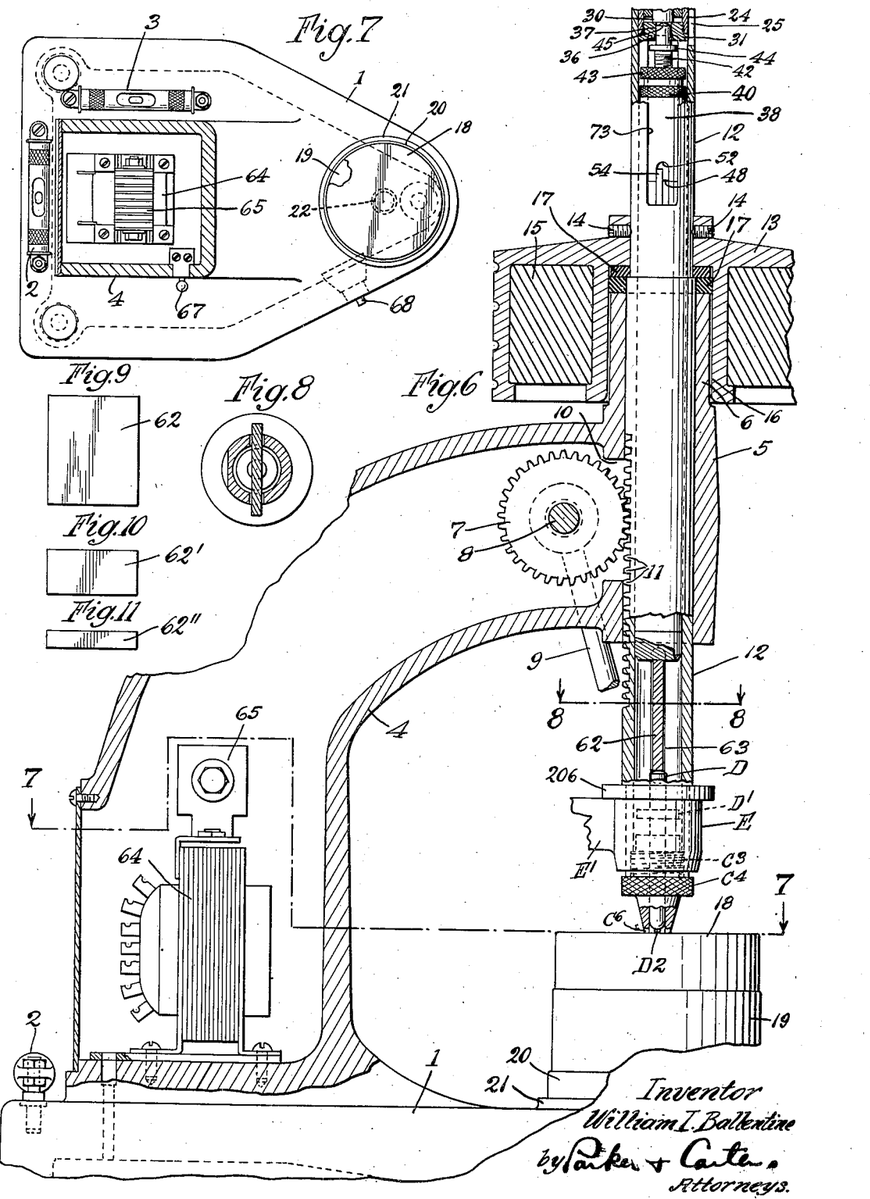
Figure 6 is a central vertical section through a modified form of the device.
Figure 7 is a section on a reduced scale along the line 7—7 of Figure 6.
Figure 8 is a section along the line 8—8 of Figure 6.
Figures 9, 10 and 11 are side elevations of the hammer drop gauge plates.
Figure 12:
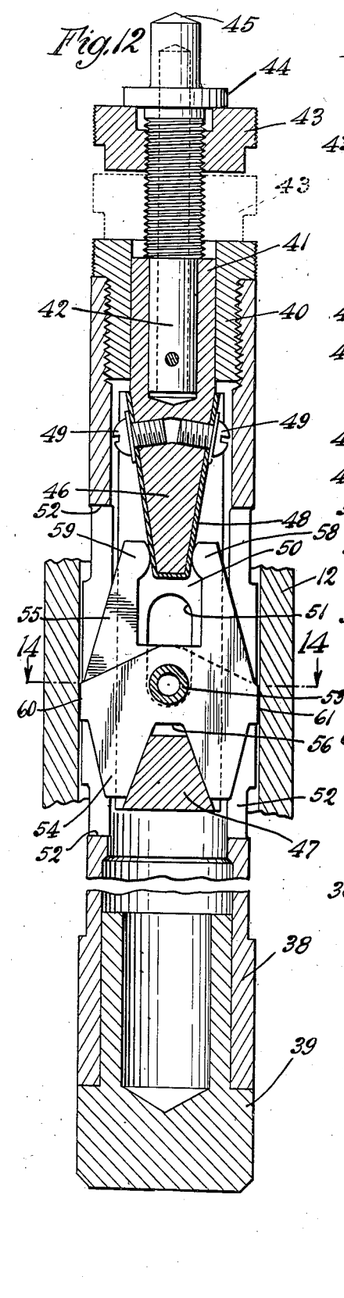
Figure 12 is a central longitudinal section through the preferred form of hammer.
Figures 13, 14, 15:
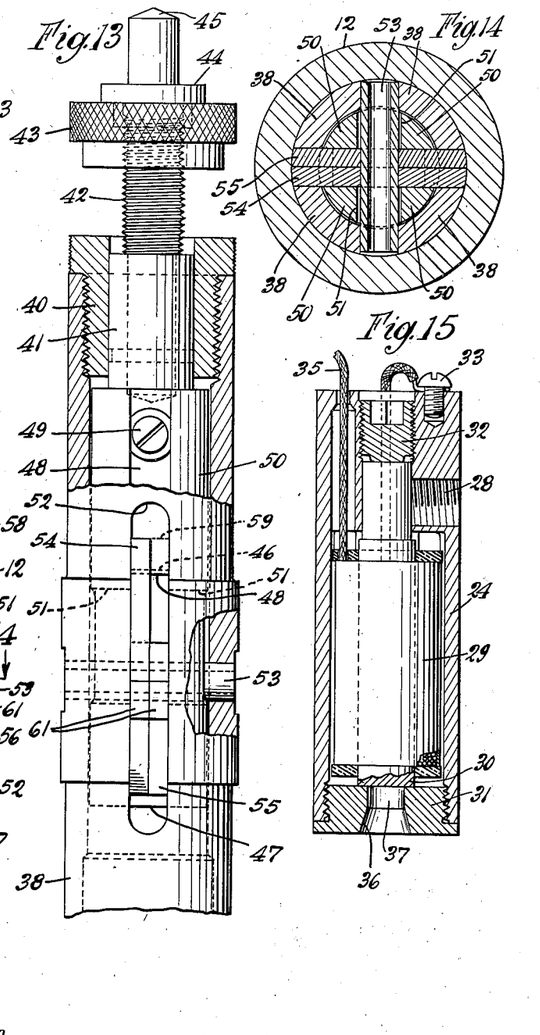
Figure 13 is a side elevation in part section of the hammer shown in Figure 12, the view being taken at right angles to the plane of the section of Figure 12.
Figure 14 is a section along the line 14—14 of Figure 12.
Figure 15 is a central section through the magnet cartridge.

The hammer is shown in Figures 12, 13 and 14. It has an aluminum barrel 38 terminating at its lower end in a steel head or shoe 39. It is closed at its upper end by a threaded and knurled aluminum plug 40. In this plug is slidably mounted an aluminum sleeve 41 in which is pinned a steel screw 42 upon which is threaded a knurled aluminum nut 43. The screw has an integral stop collar 44 and is mitered at its end at 45. It will be understood that the upper cylindrical portion of the screw may penetrate the tapered opening 36, will be centered in the cylindrical aperture 37 in the bushing 31 associated with the magnet and the pointed or curved end of the threaded piece will engage the end of the core 30 when the hammer is supported by the magnet. The aluminum sleeve 41 carries a stirrup member or yoke having above a downwardly tapered portion 46 and below, an upwardly tapered portion 47. The downwardly tapered portion 46 is provided with a thin steel armor 48 held in position by means of the screws 49. The side members 50 joining the stirrup portions 46 and 47 are slotted at 51. The hammer barrel 38 is slotted at 52 on opposed sides. 53 is a hollow pivot pin of steel rigidly mounted on the hammer barrel or body 38 and it has pivoted thereon two opposed rebound jaws 54 and 55. Each of these rebound jaws has a downwardly extended forked or slotted portion 56 to rest upon and be locked in central position by the stirrup portion 47. The jaw 54 has an upward extension 58 engaging one side of the armored member 46, the jaw 55 has an upward extension 59 engaging the other side of the armored member 46. When the parts are in the position shown in Figure 12, the hammer is supported by the magnet and pin 45. The stirrup engages the lower slotted portions of the dogs and the hammer is held suspended in the tube, the dogs having their tube engaging portions 60, 61 held by the engagement of the parts 47 and 56 out of contact with the tube and the hammer hangs freely. When the nut 43 is in the dotted line position shown in Figure 12, the dog and stirrup relationship is the same no matter what the position of the parts as if the hammer were suspended by the electromagnet. The hammer will be supported before it is released by the yoke which is held in place by the electromagnetic force and so the hammer will be at the extreme downward end of its excursion with respect to the yoke. When the yoke is released by cutting off the electric circuit, the hammer and yoke will fall freely without jar or jolt and without any relative displacement of the hammer and yoke. At the end of its excursion the hammer will be arrested as it strikes the penetration pin D and will then rebound. The yoke will still be falling freely at the same rate as the rate of fall of the hammer. The rebound action of the hammer will continue without reference to the yoke until the downward movement of the yoke is arrested by the contact between the armored portion 48 of the yoke and the arms 58, 59 of the dogs. This relative downward movement of the yoke and dogs will, of course, result in disengaging the part of the yoke 47 from the notches 56 in the dogs and the dogs will be caused to rotate by the relative downward movement of yoke and hammer. This action will be completed substantially at the extreme upward rebound movement of the hammer and the dogs will thus grip the inner wall of the tube and hold the hammer at a point adjacent the upper limit of the rebound excursion and out of contact with the penetration pin D, thus insuring that the penetration pin D be hit by the hammer but a single time for each drop of the hammer. The hammer is shown in the suspended position in Figure 16 in its relationship with the other parts. In Figure 6, the hammer is shown in the upper position but it is shown with the nut 43 screwed down so as to insure that the relationship between the stirrup, the hammer and the dogs will be the same as if it were supported by the electromagnet even though the tube 12 has been brought down below the working position.

It will be noted that in this case the hammer is no longer supported by the electromagnet but is supported by the gauge plate 62 which is inserted through the slots 63 in the wall of the tube 12, the lower edge of the gauge plate resting on the penetrator member D, and the hammer head 39 resting on the upper edge of the plate 62. For making this adjustment, the nut 26 will be released and the electromagnet cartridge moved up or down as the case may be until the hammer rests on the gauge plate or until the hammer is high enough to permit the gauge plate to be introduced between it and the member D, whereupon the magnet sleeve will be locked in place. The gauge plate will be withdrawn and the work may then be placed beneath the penetration member at the bottom of the tube on the anvil 18, the up and down movement of the sleeve being accomplished by the lever 9. No measurements and no skillful manipulation are required under these circumstances to control or adjust the hammer fall. The most unskilled operator can lower the tube to clear the slots 63, can then introduce the gauge plate 62, let the hammer and the magnet come down upon it, lock the magnet in place, withdraw the gauge plate 62, and then raise the sleeve to put the work in. The distance through which the hammer falls is altogether independent of the position of the tube 12. The tube 12 is held by the weight of the ballast 15 in such position that the head C⁴ rests upon the work and the point of the penetration member also rests upon the work ready to be forced into the material when the penetration member is struck by the hammer. The base is the support, the riser merely guides the parts. All the load of the hold down is concentrically applied to the work, there being no springs or counterbalance or the like to give any eccentric loads or to load any of the parts except the tube 12 which is rigid and stiff enough to satisfactorily support as a compression member the weight of the ballast.

In Figures 10 and 11, gauge plates $62^1$ and $62^{11}$ are shown. These plates are narrower than the one 62 shown in Figure 9 but their function is exactly the same. Experience shows that for investigating different kinds of materials, it is necessary to use different hammer drops and for instance a convenient combination is to have the widest gauge plate 50 mm. wide, the intermediate one 20 mm. and the narrowest one 8 mm., such widths are usually satisfactory for testing respectively metals of the usual hardness of steel and iron, metals of the usual hardness of copper and aluminum and metals of the usual hardness of zinc and lead but whatever the width of the gauge plate, the way in which the plate is used and the way in which the adjustments are made is the same.

Mounted upon the upright 4 is a transformer 64 associated with a dry plate rectifier 65. The transformer is energized from any suitable electric light circuit by means of the wires 69, 70 controlled by the switch 67 preferably on the outside of the upright 4. One pole of the transformer is grounded on the framework and so the rectifier which is mounted on the transformer is also grounded. The wire 71 leads from the rectifier through a push button switch 68 which is adapted to be normally closed but to be opened by the operator. The wire 35 communicates with the other terminal of the switch and the magnet coil 29 is grounded through the wire 33, cartridge 24, the wire 72 so that when the switch 67 is closed, the transformer and the drive plate rectifier together energize the circuit to excite the electromagnet. When the operator wishes to release the hammer, a touch on the button 68 breaks the circuit and allows the hammer to fall.

Figures 16, 17, 18:
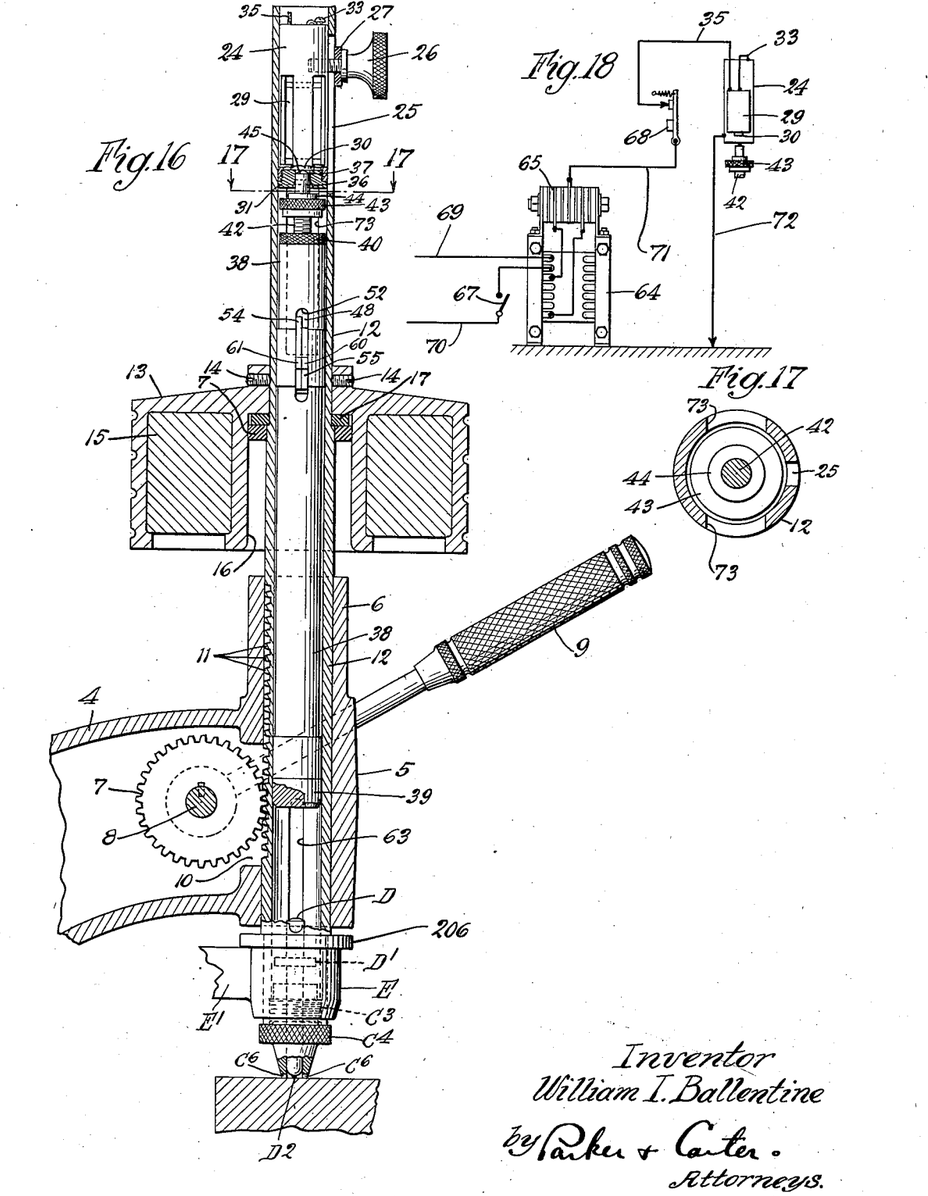
Figure 16 is a detail section of part of the device shown in Figure 6 in a different position.
Figure 17 is a section along the line 17—17 of Figure 16.
Figure 18 is a wiring diagram.

It will be understood that when the parts are in the position shown in Figure 16, with the hammer supported, the hammer is free to swing about its axis, and hangs freely as a plumbbob from the single point contact between its chamfered end 45 and the core 30. There is sufficient clearance between the end of the supporting threaded pin and the walls of the aperture 37 so that the whole hammer hangs freely under the influence of gravity, and out of contact with the walls of the tube 12. When the operator touches the finger button 68 on the side of the frame, the circuit is broken, the magnet releases and the hammer falls. With this release there can be no jar, no vibration and the fall is so short and so adequately protected that the hammer always falls freely without contacting the walls of the tube. It is caught by the rebound and the operator can read accurately the depth of penetration on the gauge. This reading is taken by first setting the gauge to zero, when the penetrator point is against the work, and by then reading the depth of penetration after the hammer has fallen. If for any reason, it is desired as is sometimes the case, to make an initial penetration, this may be done but before the reading is taken, the gauge will have to be set back to zero because the thing that is measured in using my apparatus is the depth of penetration resultant from one blow of the hammer only.

It will be understood that after each fall, the operator may reach in through the slots 73 on opposed sides of the tube above the hold-down weight, may take hold of the knurled nut 43 and with thumb and finger only may raise the hammer back into the position at which the magnet will hold it, the force he may use being limited by the fact that he has to reach in between these two slots and use his thumb and finger only. No special venting of the tube is needed. There is sufficient clearance between the hammer and the tube and the slots 63 together with the slots 73 to permit adequate escape of air so that there is no measurable cushioning effect and no measurable or perceptible interference with the smooth, free and accurate hammer fall.

When it is desired to determine the hardness of any material, my apparatus is placed upon a suitable base or foundation and is leveled. A piece of the material, the hardness of which is to be determined, is then placed either directly upon the seat or, in case it is relatively thin or small, upon one or more blocks which themselves rest upon the seat 20. The object which is to be tested is thus raised until it is close to the member $C^4$. Then the tube or barrel C or 12 is lowered so that the end of the member $C^4$ rests upon the material to be tested. If the apparatus embodies the moving wheel $B^9$, the barrel is lowered by rotating the wheel. The pinion $B^8$ engages with the rack $C^1$ and so movement of the wheel $B^9$ moves the barrel. The counterweight $B^4$ through the flexible member $B^5$ serves to balance the barrel and the parts which it carries.

When the barrel has been lowered so that the bottom of the member $C^4$ contacts the article to be tested, it may be locked in place by means of the locking wheel $B^{10}$. If instead of the wheel $B^9$ the lever $B^{11}$ is used, then the locking wheel may be omitted and instead of locking the barrel down, the operator will merely hold it down by depressing the lever $B^{11}$ and holding the handle $B^{12}$ during the testing operation or the ballast weight 15 only may be relied upon. The handle $B^{11}$ is, of course, mounted upon the shaft $B^7$ and rotates it in the same manner as the wheel $B^9$ rotates it.

With the object to be tested in place, and the barrel locked or held against it, testing may be carried out. The hammer will be in the raised position shown in the drawings and is held against falling by the locking pin $H^6$ which penetrates into the depression H in the hammer, or by the electromagnet.

Since the gauge $E^2$ is mounted upon the barrel, it rises and falls with it. The locking lever $E^7$ will be moved to the unlocking position and the spring $E^6$ holds one end of the lever $E^5$ down upon the flange $D^1$ and thus holds the member D in contact with the article to be tested. The other end of the lever $E^5$ is held in contact with the gauge member $E^4$ by the spring $E^6$.

With the parts in the position described above, when the operator desires to test the hardness of material, he will have chosen a suitable point, such as the point $D^2$. The members D are replaceable and interchangeable by removing the threaded plug $C^4$ and thus a point of any desired shape or material can readily be installed.

With the point $D^2$, of whatever its shape, in contact with the article to be tested, the lever $H^4$ is moved to the right as shown in Figure 1, and thus against the spring $H^3$, which moves the locking pin $H^6$ out of the groove or depression H and frees the hammer for falling or the electric circuit may be broken by the push button to cause the electromagnet to release. The hammer thus falls freely in the barrel C or 12. It may be guided against rotation by the pin $G^2$. It falls until it strikes the upper end of the penetration member D and drives the point $D^2$ into the material being tested. The movement of the point $D^2$ is registered on the gauge, because the lever $E^5$ is held in contact with the flange $D^1$ by the spring $E^6$ and moves downward with it as the point is driven into the material being tested. This downward movement of the right hand end of the lever $E^5$, as shown in Figure 2, causes a corresponding upward movement of the left hand lever, and so moves the gauge member $E^4$ and, through any desired mechanism in the gauge itself, moves the needle $E^3$. The lever $E^5$ as shown is a 1:1 lever so that movement of the flange $D^1$ is exactly equal to the movement of the member $E^4$. The ratio of the two lever arms might be any suitable ratio. Under some circumstances, it might be desirable to have the right hand arm shorter than the left hand arm so that a comparatively small movement of the penetrator member D would give a relatively large movement of the indicator needle $E^3$. The dial across which the indicator needle travels may itself be calibrated in any desired manner, to indicate the depth directly or it may be calibrated to indicate the depth according to some hardness scale. This might conform to any of the several more or less accepted hardness scales now in use or it might be some special scale and the invention is, therefore, not limited to the use of any particular scale or calibration.

While there has been shown a gauge having a fixed dial or scale and a moving needle, obviously the needle might be stationary and the dial might move and the particular details of the gauge itself form no essential part of the present invention which might be used with any desired form of gauge.

Experience has taught if accurate determinations are to be made, we must get them from a single stroke of the hammer. The hammer when it strikes the penetrating member will always rebound and hit it one or more times depending on circumstances. This must be prevented at all costs. The dogs $G^{10}$ or 60 and 61 serve this purpose. Since the lifting rod or wire $G^{14}$ is in contact with the dogs $G^{10}$, when the hammer is raised it rotates them to bring their points inward. When their points are moved inwardly, the pins $G^9$ in the block $G^7$ are brought into register with the perforations in the dogs and the spring $G^6$ moves the block $G^7$ upwardly so that the pins enter and remain in these perforations. When the hammer falls, and strikes the member D, the block $G^7$ possesses sufficient inertia to move downwardly somewhat further. In this movement it compresses the spring $G^6$ and moves the pins $G^9$ out of engagement with the perforations in the dogs $G^{10}$ and the spring $G^{11}$ is thus free to force the dogs outwardly so that their points contact and engage the interior of the barrel C and thus hold the hammer up after its rebound. I have shown in my disclosure two forms of rebound preventing mechanism but it will be understood that other mechanism may be used so long as they invariably catch the hammer after the rebound and before it has an opportunity to strike another blow.

After the hammer has fallen and the point $D^2$ has been driven into the test material, the reading of the gauge may be taken and the hammer is then raised again by pulling the rod $G^{14}$ by means of the handle $G^{15}$ or by grasping the hammer, introducing the thumb and forefinger through the slots 73. When the hammer reaches the full upper position, the latch pin $H^6$ is automatically forced into the groove or depression H by the spring $H^8$ and the parts are then again held in the inoperative position of Figure 1, or the electromagnet holds the form of hammer shown in Figure 12 in the upper position by electromagnetic force.

The barrel or tube C or 12 may be moved to any desired position and ordinarily the counterweight will be at its lowest position with the barrel at the upper position. The parts may be locked in this position by means of the locking wheel or nut $B^{10}$, in case the latter is on the machine, or be held in place by the weight 15. It is ordinarily desirable to lock the barrel against movement when the machine is not in use. Also the gauge is ordinarily locked against movement when not in use by using the locking lever $E^7$ which prevents movement of the lever $E^5$ and consequently prevents movement of the gauge or gauge parts.

The grooves H or other similar depressions for engaging the latch pin $H^6$ may be arranged in any desired manner. They may be arranged so that the latch pin may be caught in any of them except the topmost one and then released to be caught in another so that the hammer may be allowed to fall not the full distance but a shorter distance and then may be finally released for the full fall. Such a use of the hammer would, however, be exceptional, and in any event for every reading because it is desired to measure the penetration of a single stroke of the hammer, the gauge will always have to be reset to zero. The gauge will be set at zero and a shorter or preliminary drop for a short distance is made. This will result only in a slight indentation. Thereafter a longer drop of the hammer will be made which will cause a further indentation and the penetration of the second blow only is considered as the hardness indication.

206 is a leather washer resting on the head E for the purpose of cushioning against excessive upward movement of the tube 12 and C.

The mass of the tube and weight is great enough to prevent rebound of the work from the support under the impact of the hammer. This mass, of course, varies with the design of the apparatus but in any event must be sufficient to exert a strong solid downward pressure on the work to hold it in place irrespective of the hammer blow.

I claim:

1. In a hardness measuring apparatus, a supporting base, an arm projecting upwardly therefrom and having an overhanging end, a guide tube mounted for vertical movement in the overhanging end of the arm, a work penetrating member loosely supported in the tube, a hammer adapted to fall freely within the tube and hit the work penetrating member, and electromagnetic means for supporting the hammer at the upper end of its excursion, the electromagnetic means comprising a coil, a core and a non-magnetic ring associated with the coil and core and a magnetic member on the hammer having a single point contact with the core adapted to be centered by the ring.

2. In combination, a vertical tube, a hammer adapted to fall by gravity therealong, a plurality of notched dogs pivoted in the hammer, a stirrup having a tapered portion adapted to engage the notches and support the hammer through the dogs while holding the dogs in central position.

3. In combination, a vertical tube, a hammer adapted to fall by gravity therealong, a plurality of notched dogs pivoted in the hammer, a stirrup having a tapered portion adapted to engage the notches and support the hammer through the dogs while holding the dogs in central position, arms projecting from the dogs, a cam member on the stirrup in opposition to said arms and adapted upon movement of the stirrup out of the notches in the dogs to cam the dogs and cause them to grip the sides of the tube.

4. In combination, a vertical tube, a hammer adapted to fall by gravity therealong, a plurality of notched dogs pivoted in the hammer, a stirrup having a tapered portion adapted to engage the notches and support the hammer through the dogs while holding the dogs in central position, arms projecting from the dogs, a cam member on the stirrup in opposition to said arms and adapted upon movement of the stirrup out of the notches in the dogs to cam the dogs and cause them to grip the sides of the tube, means for locking the stirrup in the uppermost position independent of the supporting relation of stirrup and hammer.

5. In combination, a vertical tube, a material penetrating member loosely mounted in the tube, slots in the tube wall immediately above such member, a hammer adapted to fall through the tube, means for supporting the hammer, means for locking the supporting means in adjusted position in the tube, the tube being slotted to receive a gauge plate which is adapted to rest upon the material penetrating means and to gauge the distance between the hammer when in its adjusted supported position and the material penetrating means.

6. In a hardness measuring apparatus, a guide tube mounted for vertical movement toward and from the work, a work penetrating member loosely supported in the lower end of the tube, means concentric with the tube adapted to apply static pressure directly under the influence of gravity to the work through the tube along a line concentric with the vertical axis of the tube and to hold the tube in fixed permanent contact with the work irrespective of the operation of the penetrating member, a hammer supported for free fall in the tube adapted when it falls to strike a blow upon the work penetrating member, electromagnetic means for suspending the hammer freely under the influence of gravity at the upper end of its excursion out of contact with the walls of the tube within which it travels, the means being adapted to release and permit the hammer to fall from its position of rest to the bottom of the tube without lateral movement and means associated with the hammer for automatically arresting it on rebound and frictionally holding it in the tube at a point above the position at which it contacts the penetrating member.

7. A hammer comprising a cylindrical apertured housing closed at one end to form a head, a stirrup within the housing having a shank projecting outwardly beyond the opposed end thereof, friction jaws pivoted in the housing, opposed wedge like members on the stirrup, one adapted when the stirrup is held away from the head to retract the jaws, and the other adapted when the stirrup is forced toward the head to project the jaws outwardly through the apertures.

8. A hammer comprising a cylindrical apertured housing closed at one end to form a head, a stirrup within the housing having a shank projecting outwardly beyond the opposed end thereof, friction jaws pivoted in the housing, opposed wedge like members on the stirrup, one adapted when the stirrup is held away from the head to retract the jaws, and the other adapted when the stirrup is forced toward the head to project the jaws outwardly through the apertures, a guide tube in which the hammer is mounted for longitudinal movement, an impact member at the end of the tube upon which the hammer head may strike and means for supporting and positioning the tube to bring such impact member against the work.

9. A hammer comprising a cylindrical apertured housing closed at one end to form a head, a stirrup within the housing having a shank projecting outwardly beyond the opposed end thereof, friction jaws pivoted in the housing, opposed wedge like members on the stirrup, one adapted when the stirrup is held away from the head to retract the jaws, and the other adapted when the stirrup is forced toward the head to project the jaws outwardly through the apertures, a tube in which the hammer is free to travel, an electromagnet at one end of the tube, and means associated therewith for centering the shank in relationship with the tube under the pull of the electromagnet.

10. A hammer comprising a cylindrical apertured housing closed at one end to form a head, a stirrup within the housing having a shank projecting outwardly beyond the opposed end thereof, friction jaws pivoted in the housing, opposed wedge like members on the stirrup, one adapted when the stirrup is held away from the head to retract the jaws, and the other adapted when the stirrup is forced toward the head to project the jaws outwardly through the apertures, a tube in which the hammer is free to travel, an electromagnet at one end of the tube, and means associated therewith for centering the shank in relationship with the tube under the pull of the electromagnet, a striker member at the opposed end of the tube upon which the hammer may impinge and means for positioning the tube.

11. In combination, a vertical tube, a hammer adapted to fall by gravity vertically therein, nonmagnetic means for centering the hammer in the tube out of contact with the walls thereof, an abutment above such centering means adapted to engage the end of the hammer, an electromagnet associated with the abutment adapted to hold the end of the hammer thereagainst, the respective surfaces of hammer and abutment being concentrically divergent one from another and forming a point contact between the hammer and the abutment in substantial alignment with the vertical axis of the hammer, means for energizing the magnet to hold the hammer to the face of the abutment against the force of gravity and for deenergizing the magnet to release the hammer.

12. In a hardness measuring apparatus, a supporting base, an arm projecting upwardly therefrom and having an overhanging end, a guide tube mounted for vertical movement in the overhanging end of the arm, a work penetrating member loosely supported in the tube, a hammer adapted to fall freely within the tube and hit the work penetrating member, a weight concentric with the tube and entirely supported thereby, a work engaging member on the tube concentric with the work penetrating member, the tube being free to move vertically with respect to the arm but held in vertical position by the overhanging end thereof, the combined mass of the tube and weight being sufficient to effectively prevent rebound of the work from the support under the impact of the hammer.

13. In a hardness measuring apparatus, a supporting base, an arm projecting upwardly therefrom, and having an overhanging end, a guide tube mounted for vertical movement in the overhanging end of the arm, a work penetrating member loosely supported in the tube, a hammer adapted to fall freely within the tube and hit the work penetrating member, a work engaging member on the tube concentric with the work penetrating member, the tube being free to move vertically with respect to the arm but held in vertical position by the overhanging end thereof, the mass of the tube being sufficient to effectively prevent rebound of the work from the support under the impact of the hammer.

WILLIAM I. BALLENTINE.